US010275554B1

(12) United States Patent
Chetin et al.

(10) Patent No.: US 10,275,554 B1
(45) Date of Patent: Apr. 30, 2019

(54) DELAY PROPAGATION FOR MULTIPLE LOGIC CELLS USING CORRELATION AND COSKEWNESS OF DELAYS AND SLEW RATES IN AN INTEGRATED CIRCUIT DESIGN

(71) Applicant: Cadence Design Systems, Inc., San Jose, CA (US)

(72) Inventors: Mikhail Chetin, San Jose, CA (US); Igor Keller, Pleasanton, CA (US); Praveen Ghanta, Cupertino, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 49 days.

(21) Appl. No.: 15/652,130

(22) Filed: Jul. 17, 2017

(51) Int. Cl.
*G06F 17/50* (2006.01)
*G06F 17/15* (2006.01)
*G06F 16/901* (2019.01)

(52) U.S. Cl.
CPC ........ *G06F 17/5031* (2013.01); *G06F 16/902* (2019.01); *G06F 17/15* (2013.01); *G06F 17/5054* (2013.01); *G06F 17/5059* (2013.01)

(58) Field of Classification Search
CPC ............. G06F 17/5031; G06F 17/5054; G06F 17/5059; G06F 17/15; G06F 17/30955; G06F 16/902
See application file for complete search history.

(56) References Cited

U.S. PATENT DOCUMENTS

| 7,890,904 B2* | 2/2011 | Murgai | G06F 17/5045 |
| | | | 716/113 |
| 8,302,047 B2* | 10/2012 | Buss | H03G 7/007 |
| | | | 716/108 |
| 9,898,564 B2* | 2/2018 | Chang | G06F 17/5031 |
| 10,073,934 B1* | 9/2018 | Keller | G06F 17/5031 |
| 2004/0002844 A1* | 1/2004 | Jess | G06F 17/5036 |
| | | | 703/14 |
| 2007/0136705 A1* | 6/2007 | Hosono | G06F 17/5031 |
| | | | 716/113 |
| 2008/0034338 A1* | 2/2008 | Hosono | G06F 17/5031 |
| | | | 716/113 |
| 2015/0199462 A1* | 7/2015 | Chang | G06F 17/5031 |
| | | | 716/108 |

* cited by examiner

Primary Examiner — Naum Levin
(74) Attorney, Agent, or Firm — McDermott Will & Emery LLP

(57) ABSTRACT

A method as provided includes retrieving a correlation value from a correlation table and a coskewness value from a coskewness table. The correlation value includes a correlation between a delay distribution and a slew rate distribution, and is associated with both: an input slew rate and an output load, in a logic stage in an integrated circuit design, and the coskewness value is a coskewness between the delay distribution and the slew rate distribution. The method includes determining a partial derivative of a delay function relative to the input slew rate, determining a delay distribution for a signal through a plurality of logic stages using the correlation value, the coskewness value, and the partial derivative of the delay function relative to the input slew rate. The method also includes verifying that a statistical value of the delay distribution satisfies a desired performance value for an integrated circuit.

20 Claims, 7 Drawing Sheets

DELAY PROPAGATION FOR MULTIPLE LOGIC CELLS USING CORRELATION AND COSKEWNESS OF DELAYS AND SLEW RATES IN AN INTEGRATED CIRCUIT DESIGN

TECHNICAL FIELD

Embodiments described herein are generally related to the field of variational analysis in circuit design applications. More specifically, embodiments described herein are related to methods for propagating a delay over multiple logic cells in an integrated circuit (IC) design.

BACKGROUND

Delay estimation in IC design is desirable, as logic cells typically require the convergence of multiple signals within a certain time window for the logic flow to proceed without error. Monte Carlo (MC) simulations are often used to estimate design yields for manufacturing processes governed by random variables. Given the size and complexity of current IC designs, MC simulations are computationally expensive. Accordingly, a full statistical distribution in terms of process parameters (e.g., signal delay) is desirably obtained by supplementing a limited number of MC simulations with additional techniques (e.g., static timing analysis, STA, and the like). However, current STA analysis typically fail to accurately predict statistical distributions that have large skewness (e.g., highly non-Gaussian). Thus, in many instances, in-lieu of an accurate STA analysis, current techniques use overly pessimistic approaches, resulting in inefficient IC designs.

The description provided in the background section should not be assumed to be prior art merely because it is mentioned in or associated with the background section. The background section may include information that describes one or more aspects of the subject technology.

SUMMARY

In certain aspects, a computer-implemented method is described. The computer-implemented method includes retrieving a correlation value from a correlation table and a coskewness value from a coskewness table. The correlation value includes a correlation between a delay distribution and a slew rate distribution associated with both: an input slew rate and an output load, in a logic stage of an integrated circuit design, and the coskewness value includes a coskewness between the delay distribution and the slew rate distribution. The computer-implemented method further includes determining a partial derivative of a delay function relative to the input slew rate and determining a delay distribution for a signal through a plurality of logic stages using the correlation value, the coskewness value, and the partial derivative of the delay function relative to the input slew rate. The computer-implemented method also includes verifying that a statistical value of the delay distribution satisfies a desired performance value for the integrated circuit design.

In certain aspects, a system is described. The system includes a memory storing instructions, and at least one processor that executes the instructions to retrieve a correlation value from a correlation table and a coskewness value from a coskewness table. The correlation table and the coskewness table are associated with both: an input slew rate and an output load, in one of a plurality of logic stages in an integrated circuit. The at least one processor further executes instructions to determine a partial derivative of a delay function relative to the input slew rate, to determine a delay distribution for a signal through the plurality of logic stages using the correlation value, the coskewness value, and the partial derivative of the delay function relative to the input slew rate. The at least one processor further executes instructions to verify that a statistical value of the delay distribution satisfies a desired performance value for the integrated circuit.

In certain aspects, a non-transitory, computer-readable storage medium is described that includes instructions which, when executed by a processor cause a computer to perform a method. The method includes retrieving a correlation value from a correlation table and a coskewness value from a coskewness table. The correlation table and the coskewness table are associated with both: an input slew rate and an output load, in one of a plurality of logic stages in an integrated circuit. The method further includes determining a partial derivative of a delay function relative to the input slew rate, determining a delay distribution for a signal through a plurality of logic stages using the correlation value, the coskewness value, and the partial derivative of the delay function relative to the input slew rate. The method further includes verifying that a statistical value of the delay distribution satisfies a desired performance value of the integrated circuit.

In certain aspects, a system is described including a means for storing computer code. The system further includes a means to execute the computer code for retrieving a correlation value from a correlation table and a coskewness value from a coskewness table. The correlation table and the coskewness table are associated with both: an input slew rate and an output load, in one of a plurality of logic stages in an integrated circuit. The means to execute computer code is further configured for determining a partial derivative of a delay function relative to the input slew rate, and determining a delay distribution for a signal through a plurality of logic stages using the correlation value, the coskewness value, and the partial derivative of the delay function relative to the input slew rate. The means to execute computer code is further configured for verifying that a statistical value of the delay distribution satisfies a desired performance value of the integrated circuit.

BRIEF DESCRIPTION OF THE DRAWINGS

In the figures, elements and steps denoted by the same or similar reference numerals are associated with the same or similar elements and steps, unless indicated otherwise.

DETAILED DESCRIPTION

Figure 1:
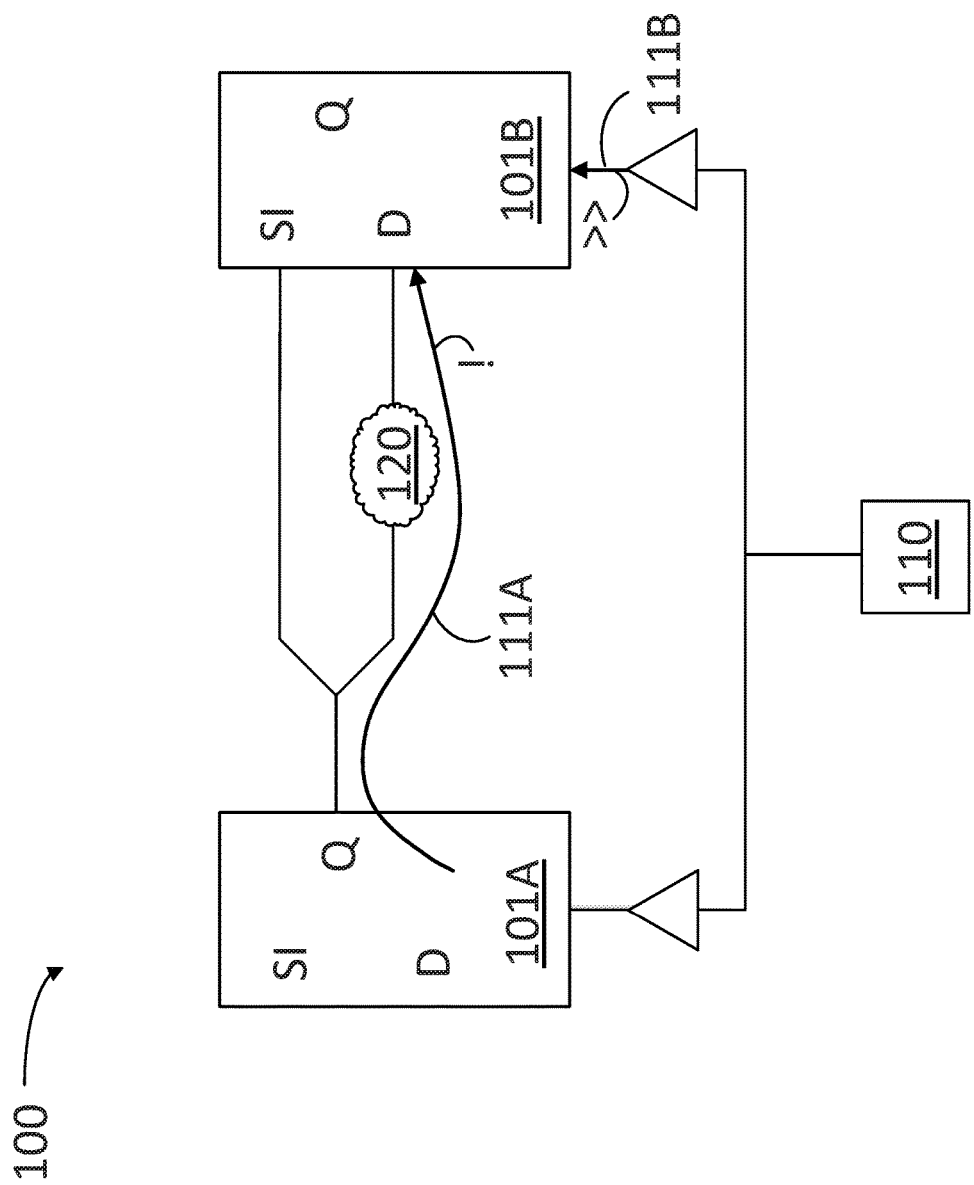
FIG. 1 illustrates a portion of an IC design including two logic cells coupled in series and driven by a clock, according to some embodiments.

The detailed description set forth below is intended as a description of various implementations and is not intended to represent the only implementations in which the subject technology may be practiced. As those skilled in the art would realize, the described implementations may be modified in different ways, all without departing from the scope of the present disclosure. Accordingly, the drawings and description are to be regarded as illustrative in nature and not restrictive.

General Overview

The disclosed system provides a method for propagating a delay distribution for multiple logic cells in an IC design. More specifically, embodiments as disclosed herein may be used in determining a yield for an IC design based on a delay distribution over multiple logic cells. Further, some embodiments may include modifying an IC design according to the yield determined based on methods as disclosed herein. Some embodiments may include modifying a circuit specification based on the yield determined according to methods disclosed herein.

IC designers and manufacturers desire to know the quantile for a delay distribution over multiple logic cells to determine yield as a function of an overall delay performance for the IC design. More generally, while this specification discloses embodiments for delay distribution in a logic path including multiple logic cells, embodiments consistent with the present disclosure may include estimation of accurate probability density functions (PDFs) for any other performance parameter of an IC design (e.g., operational current, power consumption, turn-on voltage, bandwidth, gain, and the like).

The disclosed system addresses a technical problem tied to computer technology and arising in the realm of computer simulation of hardware, namely the technical problem of propagating a delay distribution over multiple logic cells in an IC design. The disclosed system solves this technical problem by storing moments of a delay distribution for a plurality of logic stages of the IC design from a MC simulation over a sampling of random process variables in the IC design. The disclosed system further performs steps including finding at least a partial derivative of a delay function with respect to input slew from nominal simulations of delay for multiple input slews, and determining a delay distribution for the multiple logic cells in the IC design.

IC designs in embodiments as disclosed herein include multiple logic cells like flip-flops and other standard cells ('OR,' 'NOT,' 'AND,' 'NOR,' 'NAND') used in Boolean logic calculations to be performed at a gate level in a digital circuit under a pre-determined number of clock cycles (e.g., at least one). The multiple logic cells may be coupled in series (e.g., "ADD" configuration) or in parallel processing, having multiplication operations and the like (e.g., "MAX" configuration). Accordingly, embodiments as disclosed herein include the accurate derivation of a timing distribution for multiple logic cells in ADD configuration, when the timing distribution of each of the logic cells is known independently of one another. In some embodiments, such derivation may be trivial (e.g., when each of the timing distributions for the single logic cells is a Gaussian distribution). However, in many configurations such derivation may be complicated by correlations of varying degree between different random variables involved.

Traditionally, techniques such as on-chip variation (OCV) are used to estimate statistical distributions of logic timing in an IC design recognizing the impact of intrinsic variability of semiconductor manufacturing in logic timing. As a result, the performance of devices in the IC design is typically "derated" to operate under less than maximum capacity and satisfy stringent yield standards.

Embodiments as disclosed herein improve over OCV, wherein a single derating factor is applied globally in all instances of a logic arc in the IC design. Using a global derating factor may result in grossly optimistic or pessimistic estimations, and thus it is desirable to rely on more accurate techniques. Pessimistic estimations typically result in over-designing and ineffective use of IC capabilities and real-estate, thereby adding an unnecessary overhead to IC design and fabrication costs.

Embodiments as disclosed herein may also improve over techniques such as advanced-OCV (AOCV, also referred to as "SBOCV"), or location-based OCV (LOCV) which use a context specific derating factor rather than a single global derating factor. SBOCV, AOCV, and LOCV implement derating factors per minimum/maximum, per logic cell, per logic arc (e.g., is a specific pair of input and output pins of one cell. It's true, however, that it's activated in a given logic condition, for example, if cell has multiple inputs, ones that do not belong to arc have fixed voltages (logic 0 or 1). Input pin of the arc itself has given signal edge: rising (from 0 to 1) or falling (from 1 to 0), stage-count, and the like. These enhanced OCV techniques assume similar statistical variability between logic cells. This may render pessimistic or optimistic estimations. To reduce pessimism, some techniques include path-based analysis (PBA), which is costly in terms of the number of computations required for an accurate analysis. Embodiments as disclosed herein improve over the above techniques by incorporating dependency of signal time delays on slew rate and load, on slew rate variation, and on correlations between the above.

Other techniques currently implemented may include statistical STA (SSTA), which model local and global parameters statistically. However, SSTA techniques typically require preparation of, and access to, extensive libraries, adding to the computational cost of processing and storage as the accuracy of the technique depends on the size of the statistical database. In that regard, statistical OCV (SOCV) techniques include a single-parameter SSTA to provide a tradeoff for runtime/accuracy. This may reduce additional cost of analysis, but typically require variation formats for slew/load dependent delay sigmas (e.g., delay standard deviations) or transition sigmas (e.g., transition standard deviations).

FIG. 1 illustrates a portion of an IC design 100 including two logic cells 101A and 101B (hereinafter, collectively referred to as logic cells 101) coupled in series, and driven by a clock 110, according to some embodiments. Clock 110 starts a launch signal 111A in logic cell 101A, and also starts a capture signal 111B in logic cell 101B. Logic cell 101A may be, for example, a launch flip-flop that initiates a logic arc or path for launch signal 111A that ends at logic cell 101B, which may be a capture flip-flop. At each clock cycle of a combinational logic 120 (e.g., a design of logic cells performing computation of a Boolean function) it is desirable that signal 111A arrives at specific logic gates within a certain time window, to avoid errors and failure of the combinational logic. For example, in some embodiments the goal may be that launch signal 111A arrives at pin D of logic cell 101B earlier than capture signal 111B arrives at logic cell 101B.

Variability in the IC manufacturing may lead to launch signal 111A arriving in logic cell 101B delayed relative to the capture signal 111B in logic cell 101B, which may cause an undesirable circuit failure (e.g., a logic error). During circuit simulation and analysis, the occurrence of such failures may be not detected if variations of signal delays along combinational logic 120 are not considered. Accordingly, it is desirable to consider variations in signal delays along combinational logic 120 accurately, which may indicate that under certain design conditions there is a 50% probability that the portion of the IC design involving logic cell 101A, combinational logic 120, and logic cell 101B will fail. More generally, embodiments as disclosed herein may provide a statistical distribution of the delay of signal 111A, under predetermined physical conditions (e.g., a VDD voltage, and the like) which may indicate whether the IC design satisfies a desired performance value.

Accordingly, IC designers and manufacturers may desire that a delay between the arrival of launch signal 111A and the arrival of capture signal 111B at logic cell 101B within a pre-selected time window. For example, in some embodiments the selected time window may be desirably less than a clock cycle.

Figure 2:
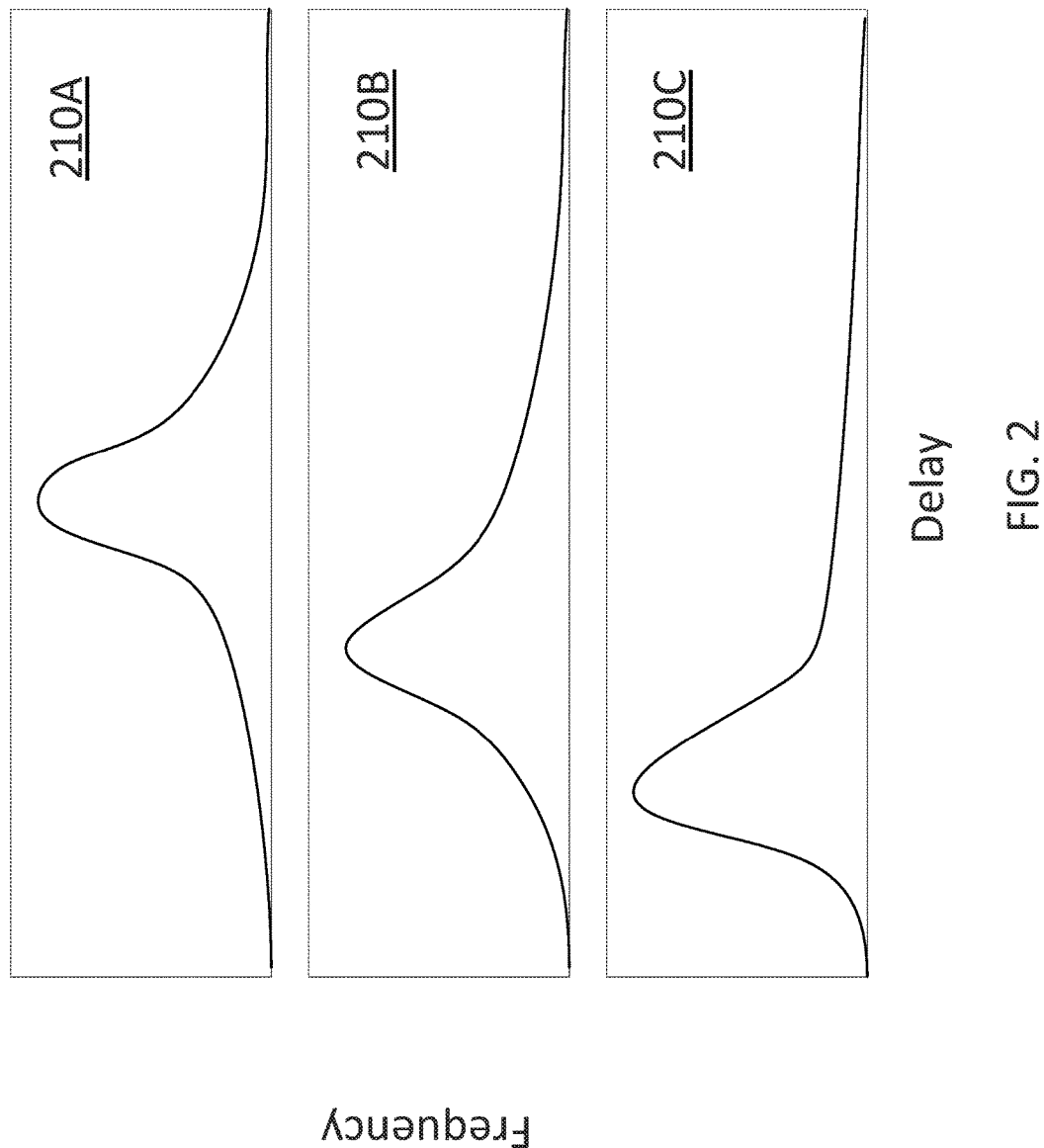
FIG. 2 illustrates delay distributions estimated with MC sampling for different process variables, according to some embodiments.

FIG. 2 illustrates delay distributions 210A, 210B, and 210C (hereinafter, collectively referred to as "delay distributions 210") estimated with MC sampling for different process variables in a single logic cell (e.g., CMOS threshold voltage, Vth, and CMOS drain voltage, Vdd, in any of logic cells 101), according to some embodiments. Delay distributions 210 may represent a delay propagation over a specific logic path including more than one logic cell in an ADD configuration.

Delay distribution 210A is obtained for 10,000 (10 k) MC samples of a large set of random variables associated with the manufacturing variability of all devices (e.g., CMOS transistors) in the logic cell, with CMOS transistors operating at Vdd=0.9 V. As can be seen, delay distribution 210A may be close to a Gaussian, or symmetric distribution. In some embodiments, high operation voltage values (e.g., Vdd~1 V) result in a symmetric delay distribution.

Delay distribution 210B is obtained for 10 k MC samples in the logic cell with CMOS transistors operating at Vdd=0.6V. Delay distribution 210B not only is centered around lower delay values, but also shows a slight departure from a symmetric, Gaussian distribution, with a longer tail for delay values beyond a peak probability density, and a shorter tail for lower delay values.

Distribution 210C is obtained for 50 k MC samples in the logic cell with CMOS transistors operating at a drain voltage, Vdd=0.45 V. At lower voltages the distribution becomes even more asymmetric and skewed, and therefore more difficult to accurately predict using MC simulations. For accurately describing asymmetric delay distribution 210C it may be desirable to perform a larger number of MC simulations.

A similar trend may be observed for delay distributions obtained with MC simulations over increasing operating values for Vth, for example. Accordingly, the asymmetry of a delay distribution may become more pronounced as Vth increases for the CMOS in the logic cell, or path.

Embodiments as disclosed herein may be applicable in sub-16 nm transistor technologies where ultra-low Vdd's induces highly asymmetric delay distributions that are difficult to model using standard procedures, or too computationally costly for MC simulations.

Accordingly, in some embodiments delay distributions 210 may be found using a timing library including multiple distribution moments for the PDF for each slew rate, load, and arc in the logic path (e.g., the slew and load of each logic cell). In some embodiments, creating an accurate timing library as above may involve intensive use of computational resources and time, especially when the delay distribution is strongly asymmetric (cf. delay distribution 210C). This may be exacerbated by correlation between delays from different logic cells in the logic path, thus requiring additional memory and runtime to evaluate propagated PDFs along the logic path.

For example, when a user is interested to find a 0.9987 quantile for a PDF (e.g., a delay value larger than the delay values for 99.87% of manufactured ICs) for a path including about 1000+ random variables per path (each random variable associated with a physical parameter of a transistor) a MC simulation may include about 10 k samples or more. The desirable size of the MC simulation increases for smaller technology nodes (e.g., 16 nm node and below). Delay distributions 210 illustrate that delay and slew distributions can be strongly non-Gaussian (e.g., exhibit both signification mean-shift and skewness effects), especially for certain parameter corners of interest for stringent device performance.

Some variability timing models may focus on determining three main central moments of delay distributions 210, d, namely:

$$i) \text{Mean-shift: } d_{mean} - d_{nom} \qquad (1.1),$$

where $d_{mean}$ is the mean of any one of delay distributions 210, and $d_{nom}$ is a nominal delay value (e.g., a delay in case of absence of variations), $$ii) \text{Standard deviation: } E[(d-d_{mean})^2]^{1/2} \qquad (1.2),$$

where E is the expected value, and $$iii) \text{Skewness: } E[(d-d_{mean})^3]^{1/3} \qquad (1.3)$$

Accordingly, a variability timing model may include tables with the above values for a delay distribution, and similar tables for slew distributions.

Figure 3:
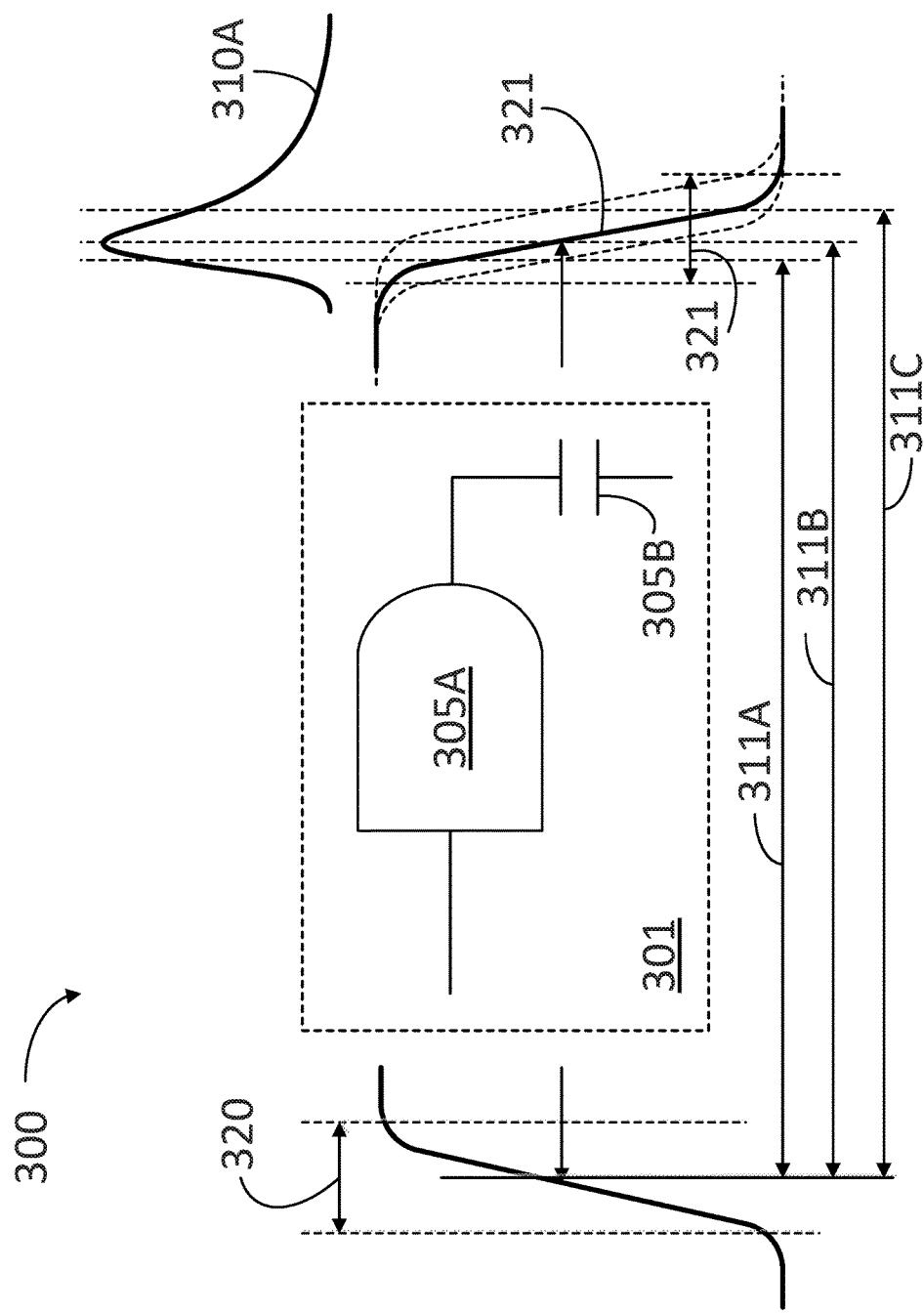
FIG. 3 illustrates a delay distribution for a single logic cell, according to some embodiments.

FIG. 3 illustrates a configuration 300 for a signal processed through a single logic cell 301, according to some embodiments. Logic cell 301 may include a logic stage 305A and a capacitance 305B (e.g., the "output load"). Applying a delay calculation (DC) analysis, an input slew 320 gives rise to a signal 321 may have multiple delays 311A, 311B, and 311C (hereinafter, collectively referred to as delays 311) having a probability density expressed by a delay distribution 310A. An output slew 331 may also be defined, and may vary and have a probability density.

In sub-16 nm technologies, variations may be quite significant leading to a heavily non-Gaussian delay distribution 310A. To model a heavily non-Gaussian delay distribution 310A, some libraries contain tables for up to $3^{rd}$ moment of delay and slew distributions. These tables may be included in variation format libraries. A variation format model may include three (3) tables for both slew and delay: a first table includes a mean shift, a second table includes a standard deviation, and a third table includes skewness. Each table contains M×N entries, for each of N input slews and M output loads (e.g., a delay value $d_{ij}$ associated to an input slew $s_i$ and an output load $o_j$).

One of characterization methods is based on MC simulations, wherein for every input slew and output load many simulations of a cell are performed by a simulation engine, which varies underlying physical parameters of a cell according to random variables specified by a foundry. Thus, the MC simulations provide delay and output slew distributions for each input slew and output load. Statistical values derived from the distributions, for each element in the table, are determined and added to the variation format library. In some embodiments, the statistical values derived from the distribution for each point in the variation format library table may include, in addition to a mean value, a standard deviation value, and a skewness value (cf. Eqs. 1.1-1.3), a correlation value, a covariance value, and a coskewness value relating delays and slews associated to the input slew and output load. Some examples may be as shown below.

In some embodiments, tables in the variation format library may include a Pearson's correlation coefficient, which is calculated from two (2) sample distributions, delay (d) and slew (s), based on the following formula:

$$r = \frac{\sum_{i=1}^{n}(d_i - \bar{d}) \cdot (s_i - \bar{s})}{\sqrt{\sum_{i=1}^{n}(d_i - \bar{d})^2} \cdot \sqrt{\sum_{i=1}^{n}(s_i - \bar{s})^2}} \qquad (2)$$

Eq. 2 is a linear correlation coefficient of random variables, represented by the samples. Hence, having delay samples, d, and slew samples (s) from a number, n, MC simulations for each input slew and output load, a table of correlations can be generated using Eq. 2.

In some embodiments, tables in the variation format library may include at least one, or two, coskewness values, as follows. Given a delay distribution d, and a slew distribution, s, a sample coskewness of "first" type, $c_1$, can be calculated as follows:

$$c_1 = \frac{\sum_{i=1}^{n}(d_i - \bar{d})^2 \cdot (s_i - \bar{s})}{\sum_{i=1}^{n}(d_i - \bar{d})^2 \cdot \sqrt{\sum_{i=1}^{n}(s_i - \bar{s})^2}} \qquad (3)$$

Further, in some embodiments, tables in the variation format library may include a coskewness of a "second" type, $c_2$, as follows:

$$c_2 = \frac{\sum_{i=1}^{n}(d_i - \bar{d}) \cdot (s_i - \bar{s})^2}{\sqrt{\sum_{i=1}^{n}(d_i - \bar{d})^2 \cdot \sum_{i=1}^{n}(s_i - \bar{s})^2}} \qquad (4)$$

In some embodiments, rather than, or in addition to, performing, n, MC simulations, other techniques may be used to obtain the three values: $r$, $c_1$ and $c_2$ (cf. Eqs. 2-4).

Calculations in Eqs. 2-4 may be performed for multiple combinations of input slew rate and output load for a given logic cell, an arc of a logic cell, and the edges of an input signal (rising and falling). A table is stored in the variation format library for each combination of indices, the combination corresponding to a specific logic cell, arc and edge.

In some embodiments, instead of or in addition to, values $r$, $c_1$, and $c_2$, a covariance value, cv, and non-normalized coskewness values $c'_1$ and $c'_2$ may be determined, to form respective tables stored in the variation format library. In some embodiments, the values for cv, $c'_1$ and $c'_2$ may be determined from the following mathematical expressions:

$$cv = \sum_{i=1}^{n}(d_i - \bar{d}) \cdot (s_i - \bar{s}) \qquad (5)$$

$$c'_1 = \sum_{i=1}^{n}(d_i - \bar{d})^2 \cdot (s_i - \bar{s}) \qquad (6)$$

$$c'_2 = \sum_{i=1}^{n}(d_i - \bar{d}) \cdot (s_i - \bar{s})^2 \qquad (7)$$

Note that Eqs. 5-7 are a non-normalized version of Eqs. 2-4, which may be useful when propagating a distribution in an ADD operation. In such configurations it may not be necessary to multiply correlation, r, and coskewness c1 and c2 with standard deviations of corresponding random variables (e.g., $\sigma_d$, $\sigma_s$).

Some examples of tables for values $r$, $c_1$ and $c_2$, or cv, $c'_1$ and $c'_2$ in the variation format library for slew and delay may be as illustrated in Tables I-III, below.

TABLE 1

Correlation Values (r)

ocv_correlation_cell_rise ( 3D_lu_template ) {
    index_1 ( "1, 2, 3");
    index_2 ( "4, 5, 6");
    index_3 ( "7, 8");
    values ("0.1, 0.2, 0.3",\
           "0.4, 0.5, 0.6",\
           "0.7, 0.8, 0.9",\
           "0.1, 0.2, 0.3",\
           "0.4, 0.5, 0.6",\
           "0.7, 0.8, 0.9");
}

TABLE 2

Coskewness Values (e1)

ocv_coskewness_nonlinear_delay_cell_rise (
    3D_ lu_ template) {
    index_1 ( "1, 2, 3");
    index_2 ( "4, 5, 6");
    index_3 ( "7, 8");
    value; ("0.1, 0.2, 0.3",\
          "0.4, 0.5, 0.6",\
          "0.7, 0.8, 0.9",\
          "0.1, 0.2, 0.3",\
          "0.4, 0.5, 0.6",\
          "0.7, 0.8, 0.9");
}

TABLE 3

Coskewness Values (c2)

ocv_coskewness_nonlinear_transition_cell_rise (
    3D_lu_template ) {
    index_1 ( "1, 2, 3");

TABLE 3-continued

Coskewness Values (c2)

```
    index_2 ( "4, 5, 6");
    index_3 ( "7, 8");
    values ("0.1, 0.2, 0.3",\
            "0.4, 0.5, 0.6",\
            "0.7, 0.8, 0.9",\
            "0.1, 0.2, 0.3",\
            "0.4, 0.5, 0.6",\
            "0.7, 0.8, 0.9");
}
```

Figure 4:
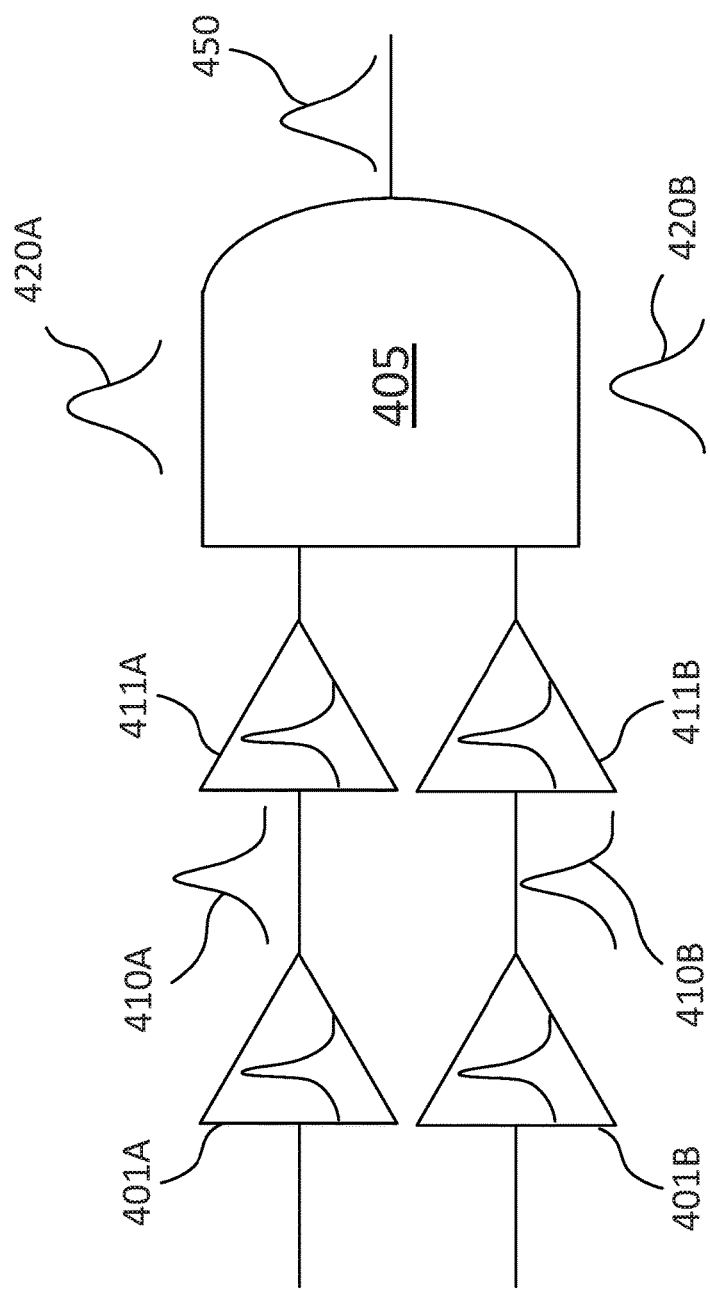
FIG. 4 illustrates a signal propagation between multiple logic cells, according to some embodiments.

FIG. 4 illustrates a signal propagation between multiple logic cells 401A, 411A, 401B, 411B, and 405, according to some embodiments. A first signal within a delay distribution 410A goes through first logic cell 401A and second logic cell 411A to result in a signal within a propagated delay distribution 420A. Likewise, a second signal within a delay distribution 410B goes through first logic cell 401B and second logic cell 411B results in a signal within a propagated delay distribution 420B. First and second logic cells 401A and 411A, or 401B and 411B, are configured in a sequential order (e.g., ADD configuration). Delay distributions 420A and 420B (hereinafter, collectively referred to as "ADD delay distributions 420") may be obtained according to methods as disclosed herein.

Logic cell 405 receives the signals from logic cells 411A and 411B in parallel, and performs a logic operation (e.g., in a MAX configuration). Accordingly, a resulting MAX delay distribution 450 is a combination of ADD delay distributions 420. In some embodiments, the relation between MAX delay distribution 450 and ADD delay distributions 420 may be non-trivial.

Obtaining detailed information from ADD delay distributions 420 includes determining the variance of the arrival time for multiple logic cells in the ADD configuration.

Figure 5:
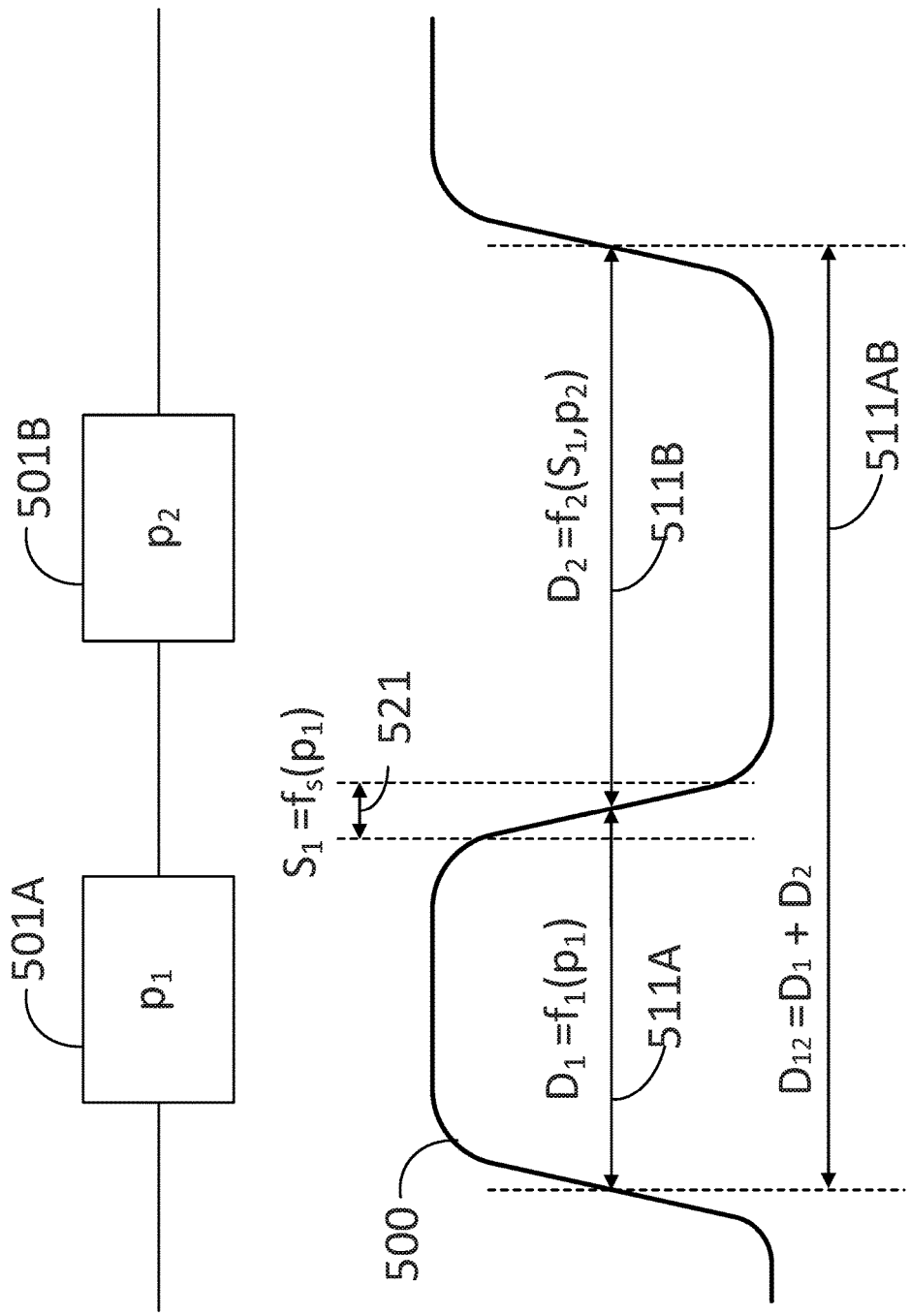
FIG. 5 illustrates a signal propagation between two logic cells, according to some embodiments.

FIG. 5 illustrates a propagation of a signal 500 between two logic cells 501A and 501B (collectively referred hereinafter as "logic cells 501"), according to some embodiments. Logic cell 501A may include a set of physical parameters (or random variables) herein denoted p1. Some examples of physical parameters, p1, may include threshold voltage values, Vth, for each of a plurality of CMOS transistors in the logic cell). Vth values may vary through variability of underlying physical transistor parameters such as dimensions, oxide thickness, dopant concentration, and the like. Likewise, logic cell 501B may include a set of physical parameters (or random variables), herein denoted p2. In embodiments consistent with the present disclosure, logic cells 501 may be arranged in sequence, relative to one another (e.g., ADD configuration).

Cell 501A induces a delay 511A ($D_1$), with an output slew 521 ($S_1$) into signal 500. Cell 501B receives signal 500 with an input slew $S_1$ and introduces a delay 511B ($D_2$) in the output, for a total delay of 511AB ("arrival time," $D_{12}$). Variables $D_1$, $D_2$, $S_1$, and $D_{12}$ are random variables that may be related by functional expressions as illustrated in the figure, namely: $D_1=f_1(p_1)$, and $D_2=f_2(S_1, p_2)$.

In some embodiments, a correlation between delays of first logic cell 501A and second logic cell 501B is due to a previous stage impact. Accordingly, in some embodiments a correlation between physical parameters p1 and p2 may be zero, close to zero, or negligible, which mathematically may be expressed as $\rho(p_1,p_2)=0$; where, $\rho$, is obtained using an expression similar to, r, or cv (cf. Eqs. 2 and 4).

In some embodiments, a determination of a standard deviation and skewness of arrival time, $D_{12}=D_1+D_2$, includes approximating the values for $D_1$ and $D_2$ as linear functions of physical parameters and slews:

$$D_1 = d_1 + \frac{\partial D_1}{\partial p_1} \cdot dp_1 \tag{8.1}$$

$$D_2 = d_2 + \frac{\partial D_2}{\partial p_2} \cdot dp_2 + \frac{\partial D_2}{\partial S_1} \cdot dS_1 \tag{8.2}$$

In some embodiments, an input slew of first logic cell 501A ($S_0$) may be included in physical parameters, $p_1$, without loss of generality. Partial derivatives of delays with respect to physical parameters, p1 and p2, and slew in Eqs. 8.1 and 8.2 may be referred to as "sensitivities." Variations of parameters $dp_1$ and $dp_2$ and variation of slew $dS_1$ may be associated with a standard deviation for the corresponding random variables (e.g., $p_1$, $p_2$, and $s_1$, respectively). The values $d_1$ and $d_2$ may be obtained from the mean of the individual delay distributions for 501A and 501B, respectively.

In some embodiments, each one of the terms:

$$\frac{\partial D_2}{\partial p_2} dp_2,$$

$$\frac{\partial D_2}{\partial S_1} dS_1$$

and $$\frac{\partial D_1}{\partial p_1} dp_1$$

in Eqs. 8.1 and 8.2 is a random variable having a standard deviation that may be denoted, respectively, as $\sigma_{22}$, $\sigma_{21}$ and $\sigma_{11}$ (cf. Eq. 1.2). Furthermore, some embodiments may also include skewness (cf. Eq. 1.3) for the above random variables as $\gamma_{22}$, $\gamma_{21}$ and $\gamma_{11}$, respectively. Moreover, according to some embodiments, the sum, $$\frac{\partial D_2}{\partial S_1} dS_1 + \frac{\partial D_1}{\partial p_1} dp_1,$$

may also be considered as a separate random variable having standard deviation, $\sigma_{21+11}$, and skewness, $\gamma_{21+11}$ (cf. Eqs. 1.2-1.3).

To compute a total variance for $D_{12}$ (e.g., arrival time 511AB), and for embodiments where $p_2$ is assumed to be independent of $p_1$ and $S_1$, the following expression may be assumed:

$$\sigma_{D12}^2 = \sigma_{22}^2 + \sigma_{21+11}^2 \tag{9}$$

In some embodiments, variances of independent random variables can be added directly. In some embodiments, to calculate $\sigma_{21+11}$, a correlation between random variables $S_1$ and $D_1$ may be considered (e.g., through the dependence of $S1$ on $p1$) for a more accurate result. Since $D_1$ is a linear function of $p_1$ (e.g., at least to the extent that Eq. 8.1 is valid), and considering the properties of linear correlation coefficients, the following expression may be assumed true:

$$\rho\left(\frac{\partial D_2}{\partial S_1} \cdot ds_1, \frac{\partial D_1}{\partial p_1} \cdot dp_1\right) = \rho(S_1, D_1) = \rho \quad (10)$$

Where, $\rho$, is the correlation coefficient that may be obtained from the tables in the variation format library (cf. Table I).

Hence, total variance translates as follows:

$$\sigma_{21+11}^2 = \sigma_{21}^2 + \sigma_{11}^2 + 2\rho \cdot \sigma_{21} \cdot \sigma_{11} \quad (11.1)$$

$$\sigma_{D12}^2 = \sigma_{22}^2 + \sigma_{21}^2 + \sigma_{11}^2 + 2\rho \cdot \sigma_{21} \cdot \sigma_{11} \quad (11.2)$$

Using the following identities: $\sigma_{11} = \sigma_{D_1}$, $\sigma_{21}^2 + \sigma_{22}^2 = \sigma_{D_2}^2$, and $$\sigma_{21} = \frac{\partial D_2}{\partial S_1} \sigma_{S_1},$$

some embodiments may use the following equation for variance of arrival time at the output of second stage:

$$\sigma_{D12}^2 = \sigma_{D1}^2 + \sigma_{D2}^2 + 2\frac{\partial D_2}{\partial S_1} \cdot \sigma_{S1} \cdot \sigma_{D1} \cdot \rho \quad (12)$$

In Eq. 12, the partial derivative of $D_2$ with respect to $S_1$ can be computed from delay table for second cell (e.g., a table in the variation format library including mean values, or nominal values (without variation) for delay in logic cell 401B, tabulated for different input slew rates). The correlation between delay and output slew of first cell can be found from a correlation table in the variation format library, as well (e.g., Table I, for logic cell 401A).

Eq. 12 may be further simplified if a covariance value, cv (cf. Eq. 5), is used instead of a correlation value in a table from the variation format library and get it from that table during add operation:

$$\sigma_{D12}^2 = \sigma_{D1}^2 + \sigma_{D2}^2 + 2\frac{\partial D_2}{\partial S_1} \cdot cv(S_1, D_1) \quad (13)$$

A second task may be to determine a skewness of the delay distribution for multiple logic cells in the ADD configuration.

In some embodiments, the product of skewness and the cube of the standard deviation of a distribution can be added for independent random variables. Similarly to variance, and keeping in mind that adding Eqs. 8.1 and 8.2 includes the random variable, $$\frac{\partial D_2}{\partial S_1} dS_1 + \frac{\partial D_1}{\partial p_1} dp_1$$

having standard deviation $\sigma_{21+11}$, and skewness $\gamma_{21+11}$, the following expression is true:

$$\gamma_{D_1+D_2} \cdot \sigma_{D_1+D_2}^3 = \gamma_{22} \cdot \sigma_{22}^3 + \gamma_{21+11} \cdot \sigma_{21+11}^3 \quad (14)$$

To calculate $\gamma_{21+11}$, some embodiment use a formula of skewness of a sum of random variables, X, and Y, through the coskewness of the first type, $C_1(X, X, Y)$, and second type, $C_2(X, Y, Y)$, (cf. Eqs. 3 and 4):

$$\gamma_{X+Y} = \frac{1}{\sigma_{X+Y}^3}[\sigma_X^3 \cdot \gamma_X + \quad (15)$$
$$3\sigma_X^2 \cdot \sigma_Y \cdot C_1(X, X, Y) + 3\sigma_X \cdot \sigma_Y^2 \cdot C_2(X, Y, Y) + \cdot \sigma_Y^3 \cdot \gamma_Y$$

Similarly to correlation, first and second type coskewness can be written as follows:

$$C_1\left(\frac{\partial D_2}{\partial S_1} \cdot ds_1, \frac{\partial D_2}{\partial S_1} \cdot ds_1, \frac{\partial D_1}{\partial p_1} \cdot dp_1\right) = C_1(S_1, S_1, D_1) \quad (16.2)$$

$$C_2\left(\frac{\partial D_2}{\partial S_1} \cdot ds_1, \frac{\partial D_1}{\partial p_1} \cdot dp_1, \frac{\partial D_1}{\partial p_1} \cdot dp_1\right) = C_2(S_1, D_1, D_1) \quad (16.2)$$

Hence formula for total skewness becomes:

$$\gamma_{D_1+D_2} \cdot \sigma_{D_1+D_2}^3 = \gamma_{22} \cdot \sigma_{22}^3 + \gamma_{21} \cdot \sigma_{21}^3 + 3\sigma_{21}^2 \cdot \sigma_{11} \cdot C_1(S_1, S_1, D_1) + 3\sigma_{21} \cdot \sigma_{11}^2 \cdot C_2(S_1, D_1, D_1) + \gamma_{11} \cdot \sigma_{11}^3 \quad (17)$$

Returning to notation $$\sigma_{11} = \sigma_{D_1}, \sigma_{21} = \frac{\partial D_2}{\partial S_1} \sigma_{S_1},$$

and taking in account that $\gamma_{22}\sigma_{22}^3 + \gamma_{21}\sigma_{21}^3 = \gamma_{D_2}\sigma_{D_2}^3$, since $p_2$ and $S_1$ are independent, some embodiments use the following equation for total skewness:

$$\gamma_{D_1+D_2} \cdot \sigma_{D_1+D_2}^2 = \quad (18)$$
$$\gamma_{D_1} \cdot \sigma_{D_1}^3 + \gamma_{D_2} \cdot \sigma_{D_2}^3 + 3\left(\frac{\partial D_2}{\partial S_1}\right)^2 \cdot \sigma_{S_1}^2 \cdot \sigma_{D_1} \cdot C_1(S_1, S_1, D_1) + $$
$$3 \cdot \frac{\partial D_2}{\partial S_1} \cdot \sigma_{S_1} \cdot \sigma_{D_1}^2 \cdot C_2(S_1, D_1, D_1)$$

Similarly to correlation, the two types of coskewness, $C_1(S_1, S_1, D_1)$, and $C_2(S_1, D_1, D_1)$ can be found from tables in the variation format library (cf. Tables II and III). In some embodiments, a simplified version of Eq. 18 may use raw skewness, which is measured in time units (for a delay distribution, d), as $\Gamma = \sqrt[3]{\gamma}\sigma$, which in some embodiments is the cube root of the $3^{rd}$ central moment of the distribution (cf. Eq. 1.3). Then Eq. 18 can be rewritten as follows:

$$\Gamma_{D_1+D_2}^3 = \Gamma_{D_1}^3 + \Gamma_{D_2}^3 + 3\left(\frac{\partial D_2}{\partial S_1}\right)^2 \cdot \sigma_{S_1}^2 \cdot \sigma_{D_1} \cdot C_1(S_1, S_1, D_1) + \quad (19)$$
$$3 \cdot \frac{\partial D_2}{\partial S_1} \cdot \sigma_{S_1} \cdot \sigma_{D_1}^2 \cdot C_2(S_1, D_1, D_1)$$

This formula can be further simplified by using non-normalized coskewness values from a table in the variation format library (cf. Eqs. 5-7):

$$\Gamma_{D_1+D_2}^3 = \Gamma_{D_1}^3 + \Gamma_{D_2}^3 + 3\left(\frac{\partial D_2}{\partial S_1}\right)^2 \cdot C_1' + 3 \cdot \frac{\partial D_2}{\partial S_1} \cdot C_2' \quad (20)$$

Following the logic and analysis leading from Eq. 2 through Eq. 20, in some embodiments include a third, a fourth, or any number of logic cells in an ADD sequence. Considering k subsequent cells, embodiments consistent with the present disclosure may propagate signal delays in a similar manner, as follows:

$$D_1 = d_1 + \frac{\partial D_1}{\partial p_1} \cdot dp_1 \qquad (21)$$

$$D_2 = d_2 + \frac{\partial D_2}{\partial p_2} \cdot dp_2 + \frac{\partial D_2}{\partial S_1} \cdot ds_1$$

$$D_3 = d_3 + \frac{\partial D_3}{\partial p_3} \cdot dp_3 + \frac{\partial D_3}{\partial S_2} \cdot ds_2$$

...

$$D_k = d_k + \frac{\partial D_k}{\partial p_k} \cdot dp_k + \frac{\partial D_k}{\partial S_{k-1}} \cdot ds_{k-1}$$

In this case, correlated pairs of terms will be $$\frac{\partial D_i}{\partial p_i} dp_i$$

and $$\frac{\partial D_{i+1}}{\partial s_i} dS_i.$$

similarly to $\sigma_{21+11}$ and $\gamma_{21+11}$ a standard deviation and skewness of the sum of such terms may be denoted as $\sigma_{cor_i}$ and $\gamma_{cor_i}$. In some embodiments, the values for $\sigma_{cor_i}$ and for $\gamma_{cor_i}$ may be calculated through correlation and coskewness between delays and slews at each prior stage in the sequence of logic cells. All other notations remain the same as in 2-cell case. So total variance will be calculated as follows:

$$\text{Var}\left[\sum_{i=1}^{k} D_i\right] = \qquad (22)$$

$$\sigma_{kk}^2 + \sum_{i=1}^{k} \sigma_{cor_i} = \sigma_{kk}^2 + \sum_{i=1}^{k} (\sigma_{i+1,i}^2 + \sigma_{ii}^2 + 2\sigma_{i+1,i} \cdot \sigma_{ii} \cdot \rho_i)$$

where $$\rho_i = \rho\left(\frac{\partial D_{i+1}}{\partial S_i} dS_i, \frac{\partial D_i}{\partial p_i} dp_i\right) = \rho(S_i, D_{p,i}),$$

where index p for delay stands for first delay term $$\frac{\partial D_i}{\partial p_i} dp_i,$$

which is a physical part of delay (dependent on physical parameters only, and excluding part dependent on input slew). By denoting, $\sigma_{ii}=\sigma_{D_{p,i}}$ for i>1, Eq. 22 becomes:

$$\text{Var}\left[\sum_{i=1}^{k} D_i\right] = \sum_{i=1}^{k} \sigma_{D_i}^2 + \sum_{i=1}^{k} 2\frac{\partial D_{i+1}}{\partial S_i} \sigma_{S_i} \cdot \sigma_{D_{p,i}} \cdot \rho(S_i, D_{p,i}) \qquad (23)$$

Since during library characterization input slew is not varied, some embodiments can get $\sigma_{D_{p,i}}$ from the appropriate table in the variation format library for standard deviation of delay and $\rho(S_i, D_{p,i})$ from proposed library table for correlation.

In similar manner total skewness can be computed:

$$\gamma_{sum} \cdot \sigma_{sum}^3 = \qquad (24)$$

$$\gamma_{kk} \cdot \sigma_{kk}^3 + \sum_{i=1}^{k} \gamma_{i+1,i} \cdot \sigma_{i+1,i}^3 + \gamma_{ii} \cdot \sigma_{ii}^3 + 3\sigma_{i+1,i}^2 \cdot \sigma_{ii} \cdot C_1(S_i, S_i, D_{p,i}) +$$

$$3\sigma_{i+1,i} \cdot \sigma_{ii}^2 \cdot C_2(S_i, D_{p,i}, D_{p,i}) = \sum_{i=1}^{k} \gamma_{D_i} \cdot \sigma_{D_i}^3 + \cdot$$

$$\sum_{i=1}^{k-1} \left(3\left(\frac{\partial D_{i+1}}{\partial S_i}\right)^2 \cdot \sigma_{S_i}^2 \cdot \sigma_{D_{p,i}} \cdot C_1(S_i, S_i, D_{p,i}) + \cdot 3 \right.$$

$$\left. \frac{\partial D_{i+1}}{\partial S_i} \cdot \sigma_{S_i} \cdot \sigma_{D_{p,i}}^2 \cdot C_2(S_i, D_{p,i}, D_{p,i})\right)$$

Accordingly, in some embodiments step 606 includes retrieving values $C_1(S_i, D_{p,i}, D_{p,i})$ and $C_2(S_i, S_i, D_{p,i})$ with i=1 . . . k, from a coskewness table in a variation format library. Further, in some embodiments step 606 includes using a simplified version of Eq. 23 with non-normalized coskewness values $c'_1$ and $c'_2$ (cf. Eqs. 5-7) instead of, or in addition to product of coskewness and corresponding standard deviations.

Figure 6:
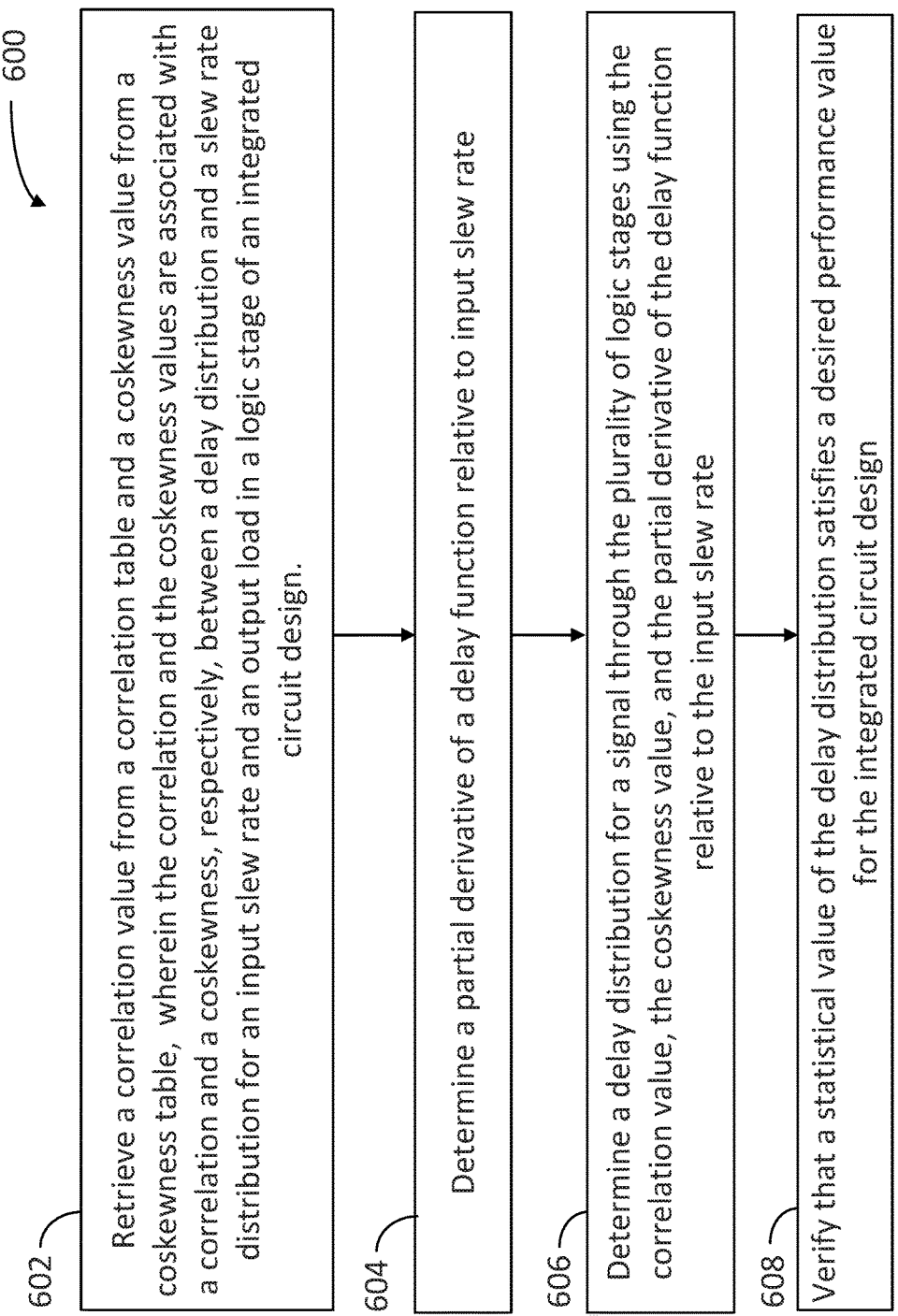
FIG. 6 is a flow chart illustrating steps in a method for propagating a delay distribution over multiple logic cells in an IC design, according to some embodiments.

FIG. 6 is a flow chart illustrating steps in a method 600, according to some embodiments. At least some of the steps in method 600 may be performed by a computer having a processor executing commands stored in a memory of the computer. Further, steps as disclosed in method 600 may include retrieving, editing, and/or storing files in a database that is part of, or is communicatively coupled to, the computer. Methods consistent with the present disclosure may include at least some, but not all of the steps illustrated in method 600, performed in a different sequence. Furthermore, methods consistent with the present disclosure may include at least two or more steps as in method 600 performed overlapping in time, or almost simultaneously.

In some embodiments, method 600 includes evaluating multiple mathematical expressions (cf. Eqs. 2-24) for propagating a delay distribution through multiple logic cells in an ADD configuration. In some embodiments, methods as disclosed herein include access to a variation format library having multiple tables storing statistical data associated with individual delay distributions and output slew rate distributions for the multiple logic cells. The statistical data in the tables may include mean values, standard deviation values, and skewness values. The statistical data in the tables may be determined using a Delay Calculation engine running a variational timing model to calculate PDFs of delay and output slew rates for each logic cell in the IC design independently. In addition to and with the help of, the tables for mean, standard deviation, and skewness, the Delay Calculation engine may prepare correlation, covariance, coskewness, and non-normalized coskewness tables (cf. Eqs. 2-7). Further, in some embodiments methods consistent with method 600 can be extended to any number of subsequent logic cells in the ADD configuration, which allows to perform statistical moments propagation and improve accuracy of statistical timing.

Step 602 includes retrieving a correlation value from the correlation table and a coskewness value from the coskewness table, wherein the correlation and the coskewness values are associated with a correlation and a coskewness, respectively, between a delay distribution and a slew rate distribution for an input slew rate and an output load in a logic stage of an IC design (cf. Eqs. 2-4, and tables I-III). In some embodiments, step 602 includes retrieving moments of the delay distribution and of the slew rate distribution for a first logic stage of an IC design, including a mean value, a variance, and a skewness. More generally, step 602 may include retrieving moments of the delay distribution and of the slew rate distribution for a second, third, or higher logic stage sequentially coupled with the first or lower order logic stage in the IC design. In some embodiments, step 602 includes accessing a library including a table with a moment of the delay distribution for the first logic stage (e.g., a mean delay table, a variance table, or a skewness table, in addition to Tables I-III for correlation, first coskewness and second coskewness), wherein the first logic stage is any one of multiple logic cells in the integrated circuit design. In some embodiments, step 602 includes accessing the correlation table in a library (e.g., Table I), the correlation table associated with an input slew rate and an output load for the first logic stage. In some embodiments, step 602 includes accessing a coskewness table in the library (e.g., Tables II-III), the coskewness table associated with an input slew rate and an output load for the first logic stage. In some embodiments, step 602 includes retrieving at least a non-normalized coskewness value or a covariance value (cf. Eqs. 5-7) between the delay distribution and the slew rate distribution for the first logic stage. In some embodiments, step 602 includes retrieving results from a plurality of Monte-Carlo simulations for a plurality of samples selected from a group of random variables associated with the integrated circuit design.

In some embodiments, step 602 may include determining the correlation value and the coskewness value from multiple samples in a delay distribution and in a slew rate distribution for the logic stage, and forming the correlation table and the coskewness table with the correlation value and the coskewness value. In some embodiments, step 602 includes storing the correlation table and the coskewness table in a variation library.

Step 604 includes determining a partial derivative of a delay function relative to the input slew rate. In some embodiments, step 604 includes determining a partial derivative of a delay function relative to the slew rate for a second logic stage subsequent to the first logic stage (cf. Eqs. 8.1 and 8.2). In some embodiments, step 604 includes determining a partial derivative of a delay function from a nominal delay table or mean delay table for the second logic stage. In some embodiments, step 604 includes retrieving a statistical value of the delay distribution as a function of an input slew rate.

Step 606 includes determining a delay distribution for a signal through the plurality of logic stages using the correlation value, the coskewness value, and the partial derivative of the delay function relative to the input slew rate. In some embodiments, step 606 includes determining a delay distribution for a signal through the first logic stage and the second logic stage. Accordingly, in some embodiments, step 606 includes determining a variance and a raw skewness of the delay distribution for the signal through the first logic stage and the second logic stage (cf. Eqs. 12 through 20). In some embodiments, step 606 includes determining a variance of the delay distribution for the signal through the first logic stage and the second logic stage using the correlation and the partial derivative (cf. Eqs. 12-13 and 22-23). In some embodiments, step 606 includes determining a skewness of the delay distribution for the signal through the first logic stage and the second logic stage (cf. Eqs. 18-19 and 24). In some embodiments, step 606 includes determining a delay distribution for a third logic stage sequentially coupled with the second logic stage (cf. Eqs. 21-24).

Step 608 includes verifying that a statistical value of the delay distribution satisfies a desired performance value for the IC design. In some embodiments, step 608 includes verifying that a quantile of the delay distribution for the signal through the first logic stage and the second logic stage satisfies a desired performance value.

In some embodiments, method 600 may considerably improve the accuracy of a delay distribution over multiple logic cells. For example, in some embodiments the error of currently available techniques is reduced by 30%, or more, when using method 600.

Table IV illustrates the improved accuracy of method 600 applied to an IC design including ten (10) identical logic cells in an ADD configuration. Table IV also includes the overall delay distribution moments obtained from 10 k MC simulations (e.g., the gold standard). Table IV shows reference moments and results and error of a method A assuming a full correlation (p=1) between delay and slew on each instance of a cell. Method A also simplifies the analysis by assuming the two coskewness values (e.g., $c_1$ and $c_2$, cf. Eqs. 3-4) also to be equal to one (1). Table IV also shows the results from method 600. Accordingly, the propagated delay distribution obtained with method 600 reduces the standard deviation error from 18.5% to 12.6%, the skewness error from 14.93% to 6.97%, and the 99.87% quantile ($3\sigma$ for a normal distribution), from 3.32% to 2.24%.

TABLE IV

| | Arrival time | | | |
|---|---|---|---|---|
| | Mean, ps | Std dev, ps | Raw skewness, ps | 0.99865-quantile, ps |
| MC simulations | 1072 | 62.7 | 40.2 | 1283 |
| Method A | 1075.9 | 74.3 | 46.2 | 1325.6 |
| Method A err | 0.36% | 18.50% | 14.93% | 3.32% |
| Method 600 | 1075.9 | 70.6 | 43 | 1311.7 |
| Method 600 err | 0.36% | 12.60% | 6.97% | 2.24% |

Figure 7:
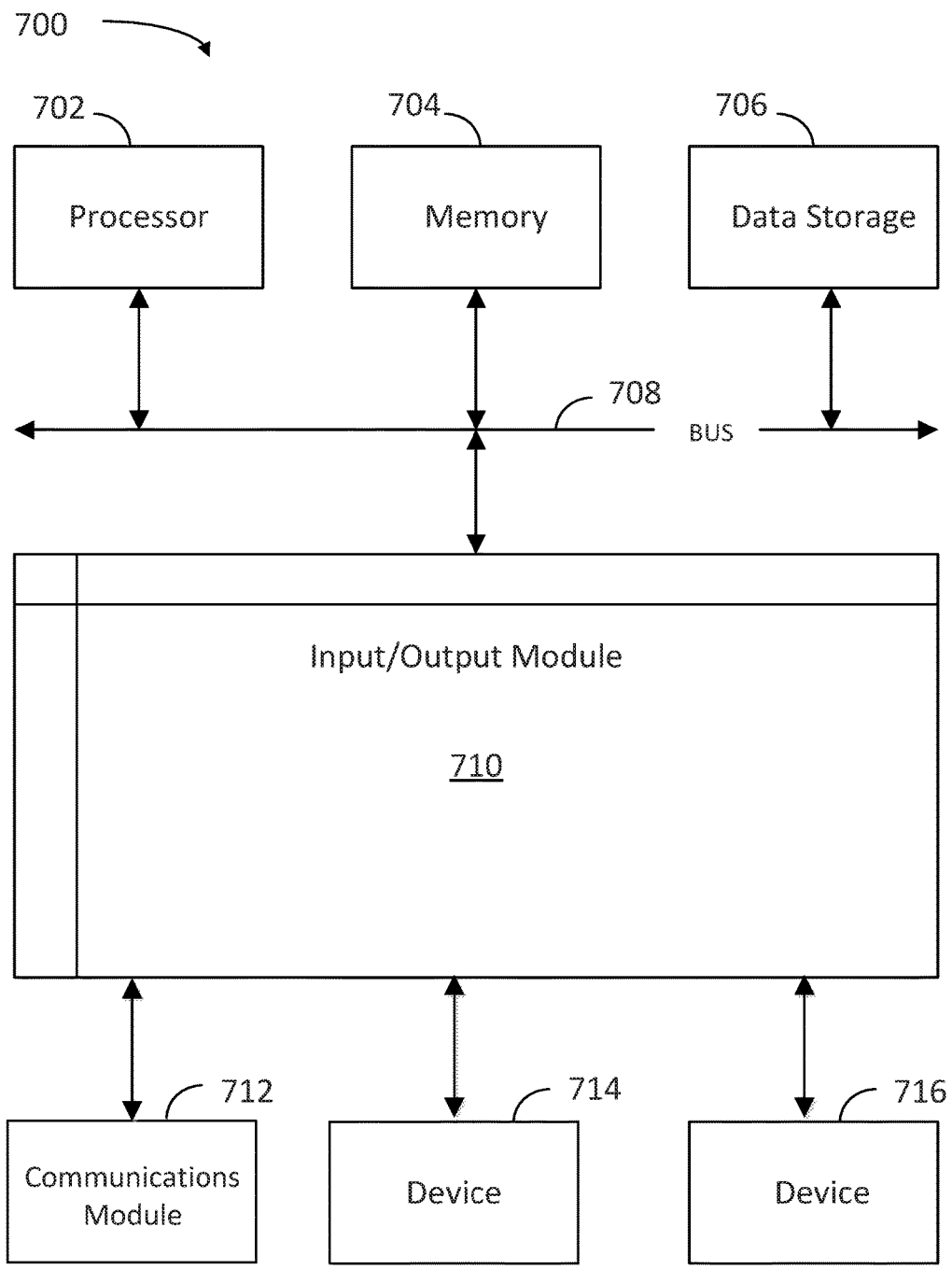
FIG. 7 is a block diagram illustrating an example computer system for determining a delay distribution over multiple logic cells in an IC design, according to some embodiments.

FIG. 7 is a block diagram illustrating an example computer system 700 with which the methods and steps illustrated in method 600 can be implemented, according to some embodiments. In certain aspects, computer system 700 can be implemented using hardware or a combination of software and hardware, either in a dedicated server, integrated into another entity, or distributed across multiple entities.

Computer system 700 includes a bus 708 or other communication mechanism for communicating information, and a processor 702 coupled with bus 708 for processing information. By way of example, computer system 700 can be implemented with one or more processors 702. Processor 702 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 702 may include modules and circuits configured as a 'placing' tool or engine, or a 'routing' tool or engine, to place devices and route channels in a circuit layout, respectively and as disclosed herein.

Computer system 700 includes, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. Processor 702 and memory 704 can be supplemented by, or incorporated in, special purpose logic circuitry.

The instructions may be stored in memory 704 and implemented in one or more computer program products, e.g., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions.

Computer system 700 is coupled via input/output module 710 to various devices. The input/output module 710 is any input/output module. Example input/output modules 710 include data ports such as USB ports. The input/output module 710 is configured to connect to a communications module 712. Example communications modules 712 include networking interface cards, such as Ethernet cards and modems. In certain aspects, the input/output module 710 is configured to connect to a plurality of devices, such as an input device 714 and/or an output device 716. Example input devices 714 include a keyboard and a pointing device, e.g., a mouse or a trackball, by which a user can provide input to the computer system 700. Other kinds of input devices 714 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 716 include display devices, such as a LED (light emitting diode), CRT (cathode ray tube), or LCD (liquid crystal display) screen, for displaying information to the user.

Methods as disclosed herein may be performed by computer system 700 in response to processor 702 executing one or more sequences of one or more instructions contained in memory 704. Such instructions may be read into memory 704 from another machine-readable medium, such as data storage device 706. Furthermore, in some embodiments data storage device 706 may include a database storing a library including multiple tables (cf. Tables I-III) with data accessible by processor 702. Execution of the sequences of instructions contained in main memory 704 causes processor 702 to perform the process steps described herein (e.g., as in method 600). One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 700 includes servers and personal computer devices. A personal computing device and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 702 for execution. Such a medium may take many forms, including, but not limited to, non-volatile media, volatile media, and transmission media. Non-volatile media include, for example, optical disks, magnetic disks, or flash memory, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one aspect, a term field effect transistor (FET) may refer to any of a variety of multi-terminal transistors generally operating on the principals of controlling an electric field to control the shape and hence the conductivity of a channel of one type of charge carrier in a semiconductor material, including, but not limited to a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method, comprising:
   retrieving a correlation value from a correlation table and a coskewness value from a coskewness table,
      wherein the correlation value comprises a correlation between a delay distribution and a slew rate distribution, and is associated with both: an input slew rate and an output load, in a logic stage of an integrated circuit design, and
      wherein the coskewness value comprises a coskewness between the delay distribution and the slew rate distribution;
   determining a partial derivative of a delay function relative to the input slew rate;
   determining a delay distribution for a signal through a plurality of logic stages using the correlation value, the coskewness value, and the partial derivative of the delay function relative to the input slew rate; and
   verifying that a statistical value of the delay distribution satisfies a desired performance value for the integrated circuit design.

2. The computer-implemented method of claim 1, further comprising storing the correlation table and the coskewness table in a variation library.

3. The computer-implemented method of claim 1, further comprising determining the correlation value and the coskewness value from multiple samples in a delay distribution and in a slew rate distribution for the logic stage, and forming the correlation table and the coskewness table with the correlation value and the coskewness value.

4. The computer-implemented method of claim 1, wherein verifying that a statistical value of the delay distribution satisfies a desired performance value comprises verifying that a quantile of the delay distribution satisfies the desired performance value.

5. The computer-implemented method of claim 1, wherein retrieving a correlation value from the correlation table and a coskewness value from the coskewness table comprises retrieving a covariance value and a non-normalized coskewness value from a table in a variation library.

6. The computer-implemented method of claim 1, wherein the delay distribution and the slew rate distribution comprise a plurality of Monte-Carlo simulations for a plurality of samples selected from a group of random variables associated with the integrated circuit design, the method further comprising forming the correlation table and the coskewness table from the plurality of Monte-Carlo simulations.

7. The computer-implemented method of claim 1, wherein determining a partial derivative of a delay function relative to the input slew rate comprises retrieving a statistical value of the delay distribution as a function of the input slew rate.

8. The computer-implemented method of claim 1, wherein determining a delay distribution for a signal through the plurality of logic stages comprises determining a skewness of the delay distribution for the signal through the plurality of logic stages.

9. The computer-implemented method of claim 1, further comprising determining a variance of the delay distribution for the signal through the plurality of logic stages using the correlation and the partial derivative.

10. The computer-implemented method of claim 1, further comprising determining a coskewness of the delay distribution for the signal through the plurality of logic stages using the correlation and the partial derivative.

11. The computer-implemented method of claim 1, wherein the plurality of logic stages comprises a second logic stage sequentially coupled preceding the logic stage, and further comprising retrieving a correlation value and a coskewness value from a correlation table and a coskewness table associated with the second logic stage.

12. A system, comprising:
a memory storing instructions; and
at least one processor that executes the instructions to:
  retrieve a correlation value from a correlation table and a coskewness value from a coskewness table, wherein the correlation table and the coskewness table are associated with both: an input slew rate and an output load, in one of a plurality of logic stages in an integrated circuit;
  determine a partial derivative of a delay function relative to the input slew rate;
  determine a delay distribution for a signal through the plurality of logic stages using the correlation value, the coskewness value, and the partial derivative of the delay function relative to the input slew rate; and
  verify that a statistical value of the delay distribution satisfies a desired performance value for the integrated circuit.

13. The system of claim 12, wherein the at least one processor further executes instructions to store the correlation table and the coskewness table in a variation library.

14. The system of claim 12, wherein the at least one processor further executes instructions to determine the correlation value and the coskewness value from multiple samples in a delay distribution and in a slew rate distribution for the logic stage, and to form the correlation table and the coskewness table with the correlation value and the coskewness value.

15. The system of claim 12, wherein to verify that a statistical value of the delay distribution satisfies a desired performance value, the at least one processor further executes instructions to verify that a quantile of the delay distribution satisfies the desired performance value.

16. The system of claim 12, wherein to retrieve a correlation value from the correlation table and a coskewness value from the coskewness table the at least one processor further executes instructions to retrieve a covariance value and a non-normalized coskewness value from a table in a variation library.

17. The system of claim 12, wherein the delay distribution and the slew rate distribution comprise a plurality of Monte-Carlo simulations for a plurality of samples selected from a group of random variables associated with the integrated circuit design, and the at least one processor further executes instructions to form the correlation table and the coskewness table from the plurality of Monte-Carlo simulations.

18. The system of claim 12, wherein to determine a partial derivative of a delay function relative to the input slew rate the at least one processor further executes instructions to retrieve a statistical value of the delay distribution as a function of the input slew rate.

19. A non-transitory, computer-readable storage medium including instructions which, when executed by a processor cause a computer to perform a method, the method comprising:
  retrieving a correlation value from a correlation table and a coskewness value from a coskewness table, wherein the correlation table and the coskewness table are associated with both: an input slew rate and an output load, in one of a plurality of logic stages in an integrated circuit;
  determining a partial derivative of a delay function relative to the input slew rate;
  determining a delay distribution for a signal through a plurality of logic stages using the correlation value, the coskewness value, and the partial derivative of the delay function relative to the input slew rate; and
  verifying that a quantile of the delay distribution satisfies a desired performance value of the integrated circuit.

20. The non-transitory, computer-readable storage medium of claim 19, wherein the plurality of logic stages comprises a second logic stage sequentially coupled preceding the logic stage, the method further comprising retrieving a correlation value and a coskewness value from a correlation table and a coskewness table associated with the second logic stage.

* * * * *